United States Patent

Ban et al.

[11] 4,107,587
[45] Aug. 15, 1978

[54] THREE-PHASE DC MOTOR HAVING NON-SUPERIMPOSED ARMATURE COILS

[76] Inventors: Itsuki Ban, 829, Higashioizumi-machi, Nerima-ky, Tokyo; Manabu Shiraki, 171 Shimotsuruma, Yamato-shi, Kanagawa-ken, both of Japan

[21] Appl. No.: 614,318

[22] Filed: Sep. 17, 1975

[30] Foreign Application Priority Data

| Sep. 24, 1974 | [JP] | Japan | 49-108866 |
| Sep. 24, 1974 | [JP] | Japan | 49-108865 |
| Jul. 31, 1975 | [JP] | Japan | 50-92553 |
| May 12, 1975 | [JP] | Japan | 50-44725 |
| Mar. 6, 1975 | [JP] | Japan | 50-26508 |

[51] Int. Cl.² ............................................ H02K 13/14
[52] U.S. Cl. ................................. 318/439; 310/202
[58] Field of Search ........................ 310/46, 202, 269; 318/138, 254, 439

[56] References Cited

U.S. PATENT DOCUMENTS

| 3,906,321 | 9/1975 | Salihi | 318/439 |
| 3,959,705 | 5/1976 | Salihi | 318/138 X |

Primary Examiner—Gene Z. Rubinson
Attorney, Agent, or Firm—George B. Oujevolk

[57] ABSTRACT

A coreless three-phase DC motor comprising a coil type armature formed with insulated windings. The armature is of a disc- or cylindrical-shape and is set rotatably against a field magnet provided with 2n magnetic poles N and S magnetized in equal angular widths. On the surface of the armature there are $3n/2$ three-phase armature coils, wherein the angular width of each of the coils is equal to the width of the field magnet pole, the coils of each phase are shifted by 180° of electrical angle from each other, and all the armature coils are arranged at equal angular intervals and not superimposedly with respect to one another.

10 Claims, 29 Drawing Figures

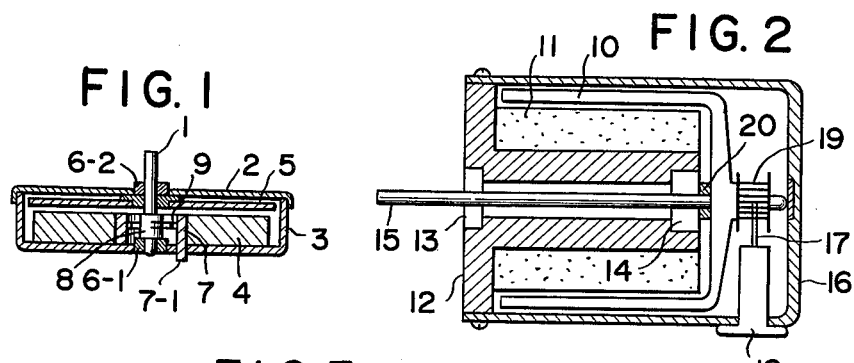
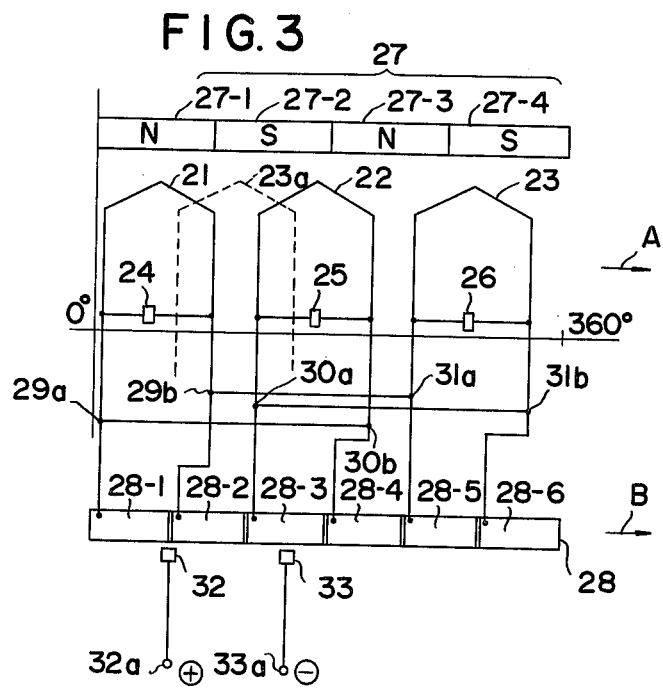
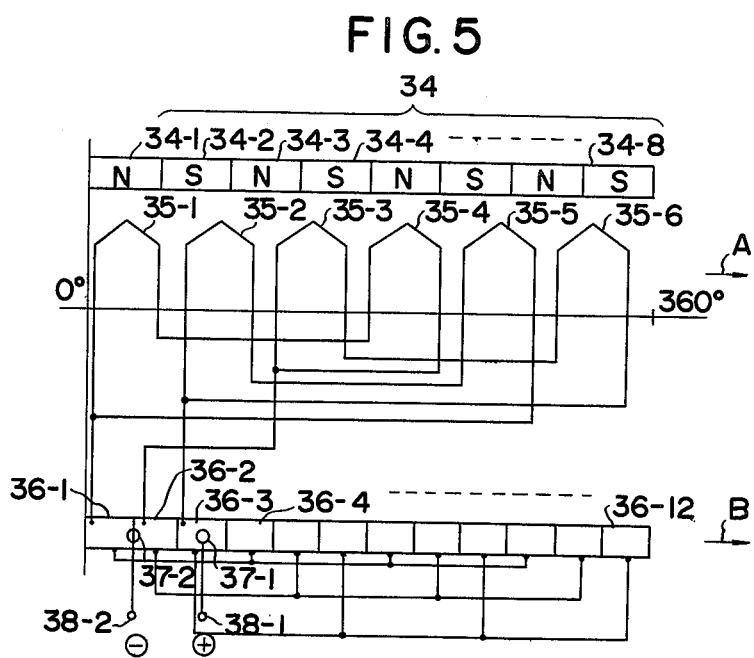

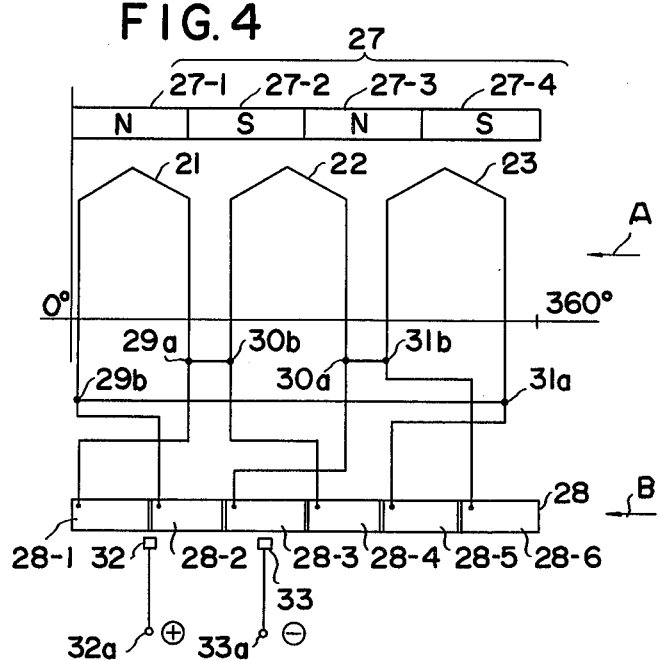
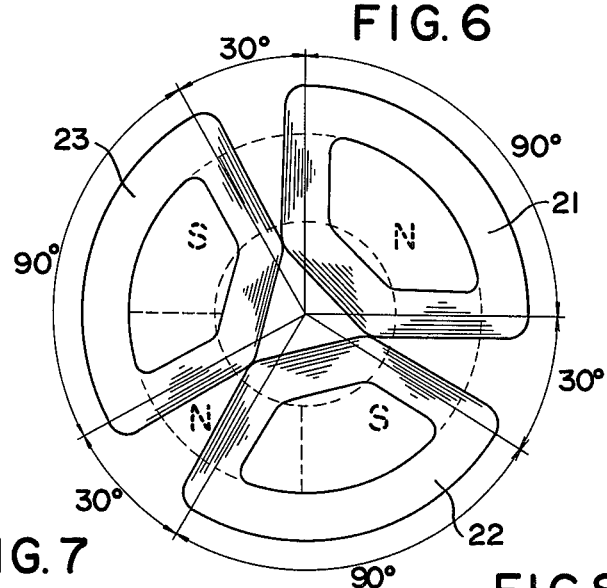
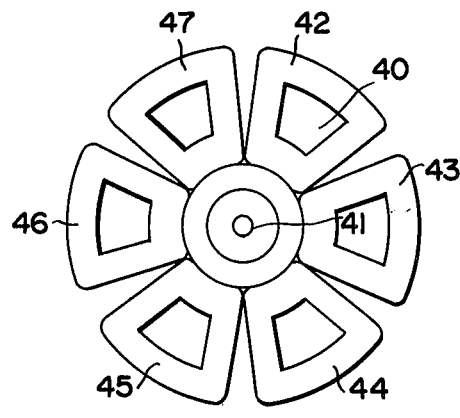
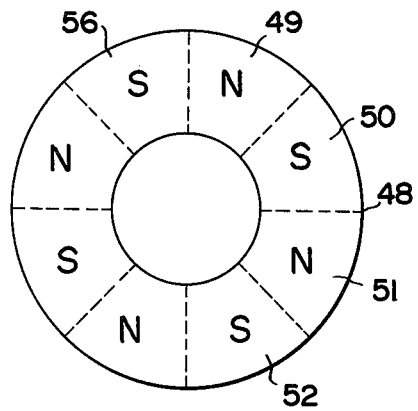

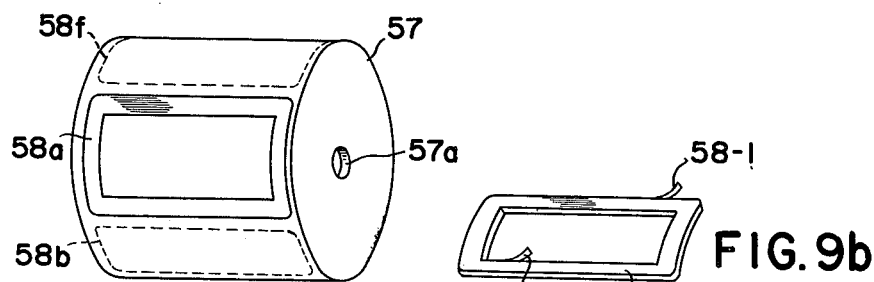
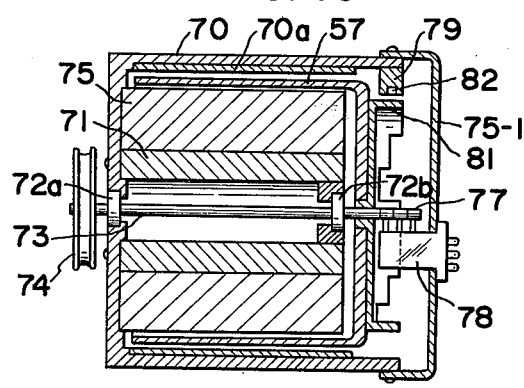
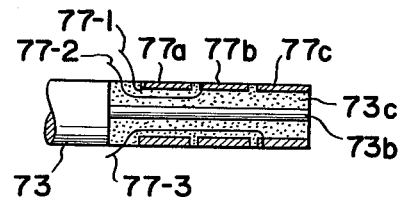
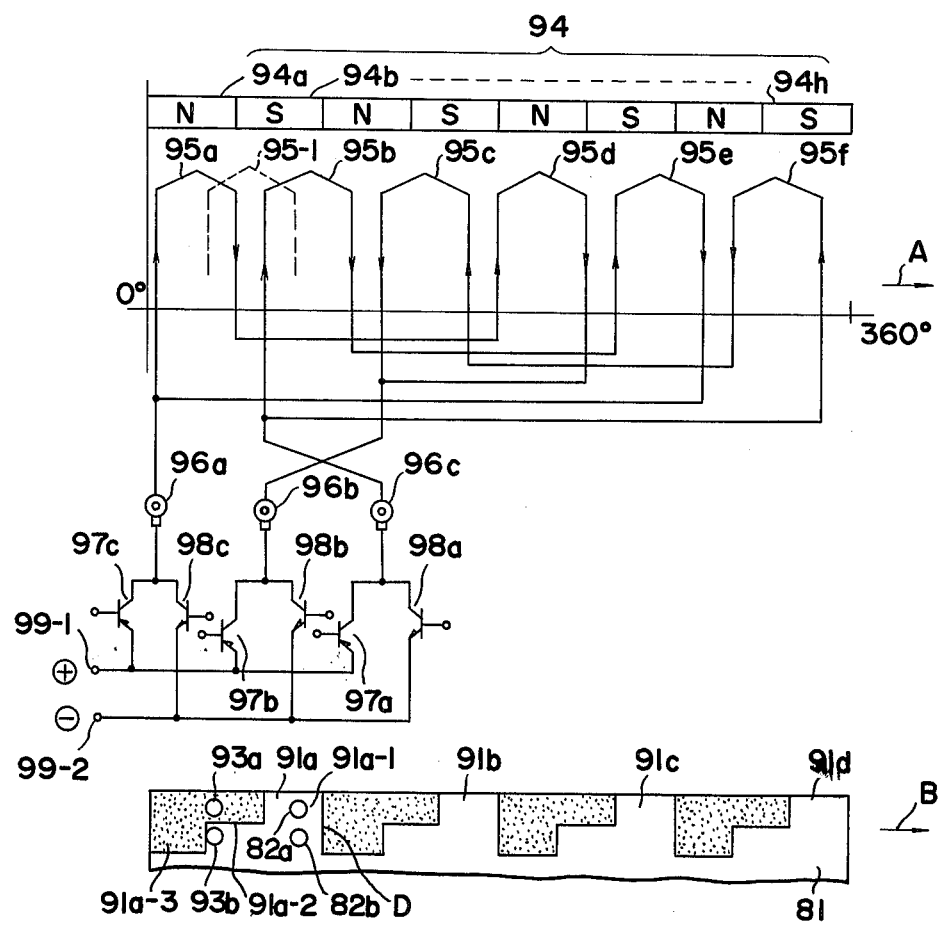

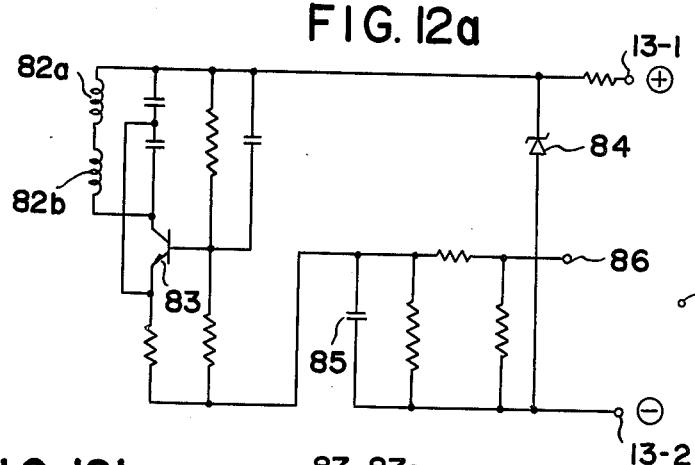
FIG. 12a
FIG. 12c
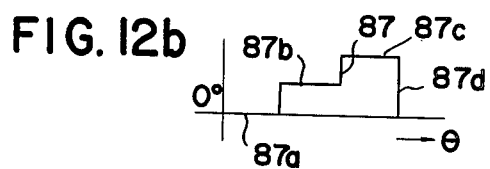
FIG. 12b
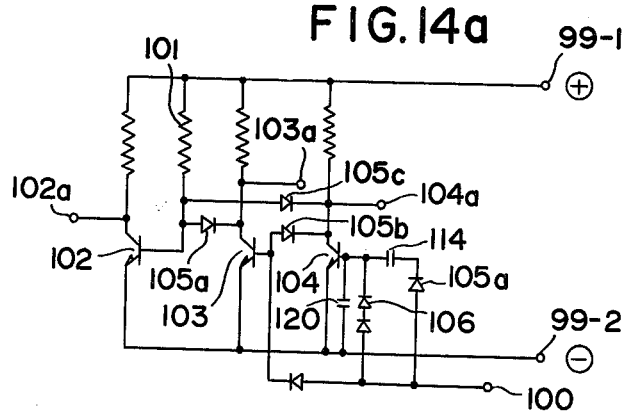
FIG. 14a
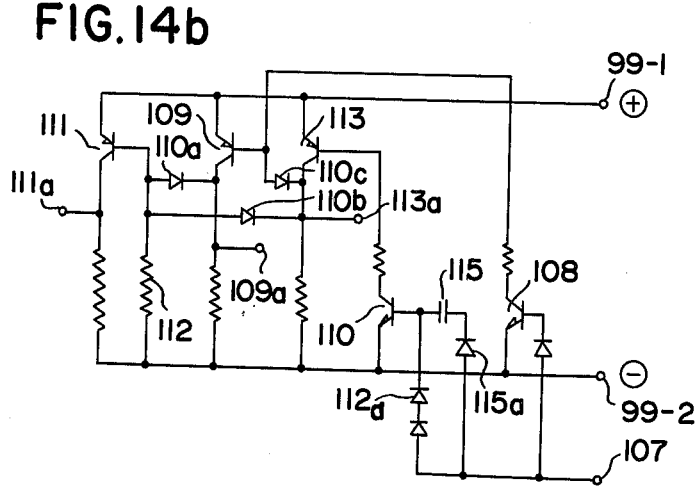
FIG. 14b

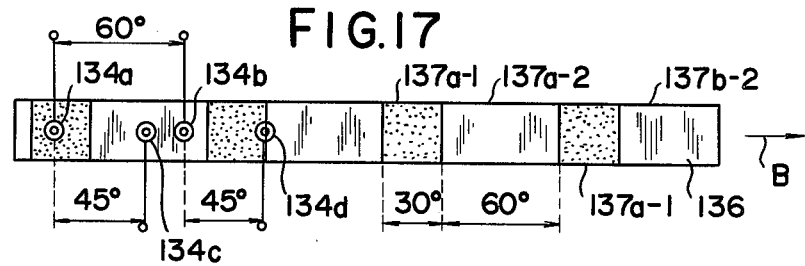
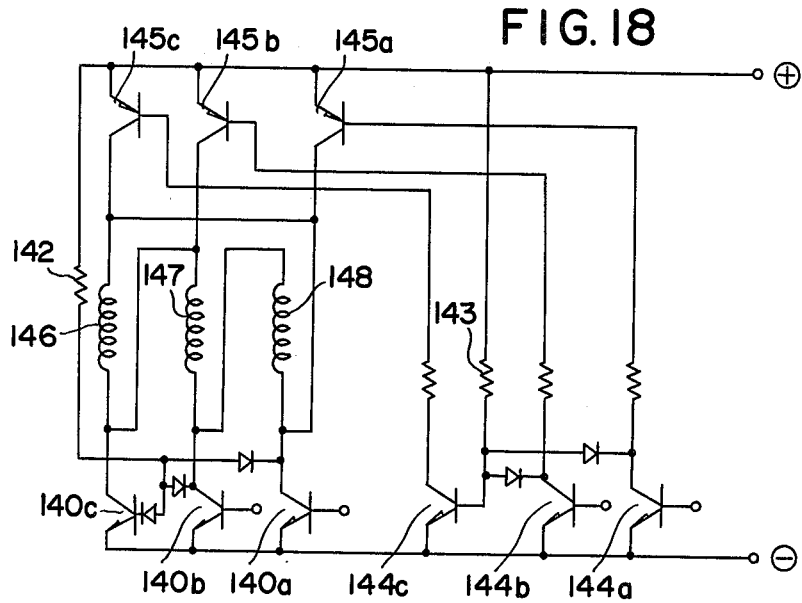
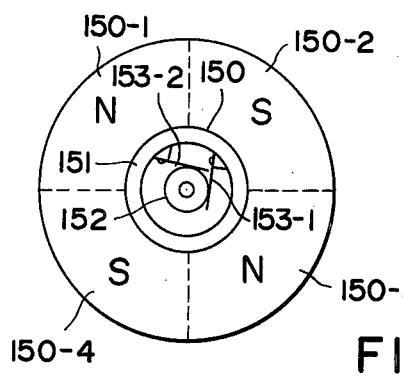
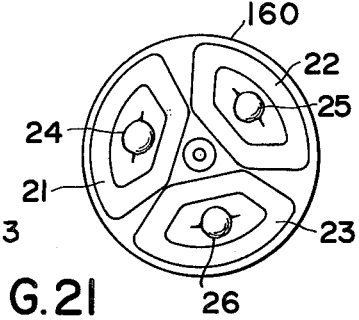
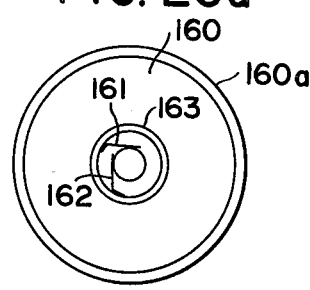
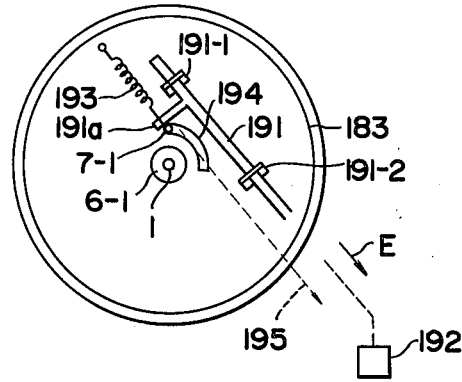

THREE-PHASE DC MOTOR HAVING NON-SUPERIMPOSED ARMATURE COILS

FIELD OF THE INVENTION

This invention relates to a three-phase DC motor comprising a coil type armature provided with insulated coil windings, particularly to a coreless three-phase DC motor wherein the three-phase armature coils are provided in a non-superimposed manner to the armature.

PRIOR ART

In prior art three-phase DC motors, armature coils are provided armature in the ordinary manner so that the coils are superimposed in three layers. This manner of providing coils causes difficulties in processing the ends of coils and makes mass production difficult. In setting coils which have been formed and rigidified onto the surface of an armature, the coils are superimposed in three layers resulting in increase of the thickness of the armature. Such increased thickness of the armature greatly weaken the effective magnetic field strength of field magnet which passes through the armature resulting in a decrease of efficiency and starting torque. Armatures in disc- or cup-type motors have good in rectifying characteristic because of their coreless structure. But these armatures have drawbacks (1) since the armature rotates, semiconductor motors are difficult to produce, and (2) since conductors of armature coils are thick, the air gap between field magnet poles is increased resulting in a decrease of magnetic field strength and accordingly in decreases of output torque and efficiency. This increase of air gap is due to the lap or wave winding of the three-phase armature coils which results in multiple superimposed layers of coils. A further drawback is the complexity that six position detecting elements are ordinarily required for forward/reverse-direction current supply to the coils of three-phase armature. A further drawback is that a flat and compact type (about 10 mm in height and 30 mm in diameter) is very difficult to realize. Still further drawbacks are that electrical noise is produced because there is not sufficient space for having elements, such as capacitors or varistors, for absorbing high voltage pulses generated by the discharge of magnetic energy which has been accumulated in the armature coils, and that the durability of commutators and brushes is decreased.

SUMMARY OF THE INVENTION

This invention has been made to solve the above described drawbacks in the prior art.

According to the invention, in a three-phase DC motor having a coil type armature provided with insulated coil windings, the angular width of the armature coils is equal to the width of the field magnet pole, and a coil or coils of one phase is shifted by 180° in electrical angle from the next phase, and all the armature coils are arranged on the armature at equal angular intervals and are not superimposed with respect to one another.

Thus, by changing the manner of connection of the armature coils from that in prior art, the armature can be reduced in thickness to several times less than the prior art coil type armature, without any particular processing with respect to the end portions of coils. With the reduction of thickness of coreless coil type armature, the air gap between the field magnets can be reduced, and accordingly the strength of the magnetic field becomes much larger resulting in a larger starting torque and a higher efficiency in the motor. With the non-superimposed arrangement of armature coils, higher mass productivity can be obtained. Further, the invention is characterized in that a higher efficiency can be obtained by reducing the region of the armature current flow as little as 2/3 of the width of the field magnet pole. Due to the winding of each of the armature coils in an angular width equal to the width of the field magnet pole there occures no counter torque, resulting in higher efficiency. The armature of the disc- or cup-type motor according to the invention is coreless, and therefore there is an advantage that nose filter elements such as capacitors and varistors can be provided in the empty space in each armature coil to obtain better rectifying characteristic and reduce electrical noise, in addition to the known advantages in the prior art that there is no loss due to eddy current and hysteresis and there is obtained good rectifying characteristic because of small inductance. Further, according to the invention, by using the non-superimposed armature coils, a semiconductor motor provided with only one element for position detection can be realized. Also, by using a plurality of position detection elements, forward/reverse-direction current supply to the armature coils becomes possible, and therefore high output semiconductor motors can be realized.

BRIEF DESCRIPTION OF THE DRAWING

FIG. 1 is a sectional view of a disc type DC motor according to the invention;

FIG. 2 is a sectional view of a cup type DC motor according to the invention;

FIGS. 3, 4 and 5 are expanded views of the armature coil, field magnet and commutator of the motors of FIGS. 1 and 2;

FIGS. 6 and 7 are explanatory views of the armature of the disc type motor of FIG. 1;

FIG. 8 is an explanatory view of field magnet poles to be associated with the armature of FIG. 7;

FIG. 9(a) and FIG. 9(b) is an explanatory view of the armature of the cup type motor of FIG. 2;

FIG. 10 is a sectional view of a semiconductor motor which has been built using semiconductor in the cup type motor of FIG. 2;

FIG. 11 is an explanatory view of the slip rings used in the motor of FIG. 10;

FIG. 12(a) and FIG. 12(b) and FIG. 12(c) are an explanatory view of an oscillation circuit for detecting position used in the motor of FIG. 10;

FIG. 13 is an expanded view of the field magnet and armature coils used in the motor of FIG. 10;

FIG. 14(a) and FIG. 14(b) shows control circuit diagrams for obtaining position detection signal shown in FIG. 12(b);

FIG. 17 shows the arrangement of position detection elements for obtaining the voltage wave forms resulting from the position detection elements of FIG. 16;

FIG. 18 shows a circuit diagram of the armature coils used in the motor of FIG. 10;

FIG. 19 shows the arrangement of field magnet poles and brushes in the motor of FIG. 1;

FIG. 2O(a) and FIG. 2(b) is an explanatory view of the armature of the motor of FIG. 1; and FIG. 21 is an explanatory view of the forward-/reverse convertion device in the motor of FIG. 1.

DETAILED DESCRIPTION OF THE INVENTION

Figure 15:
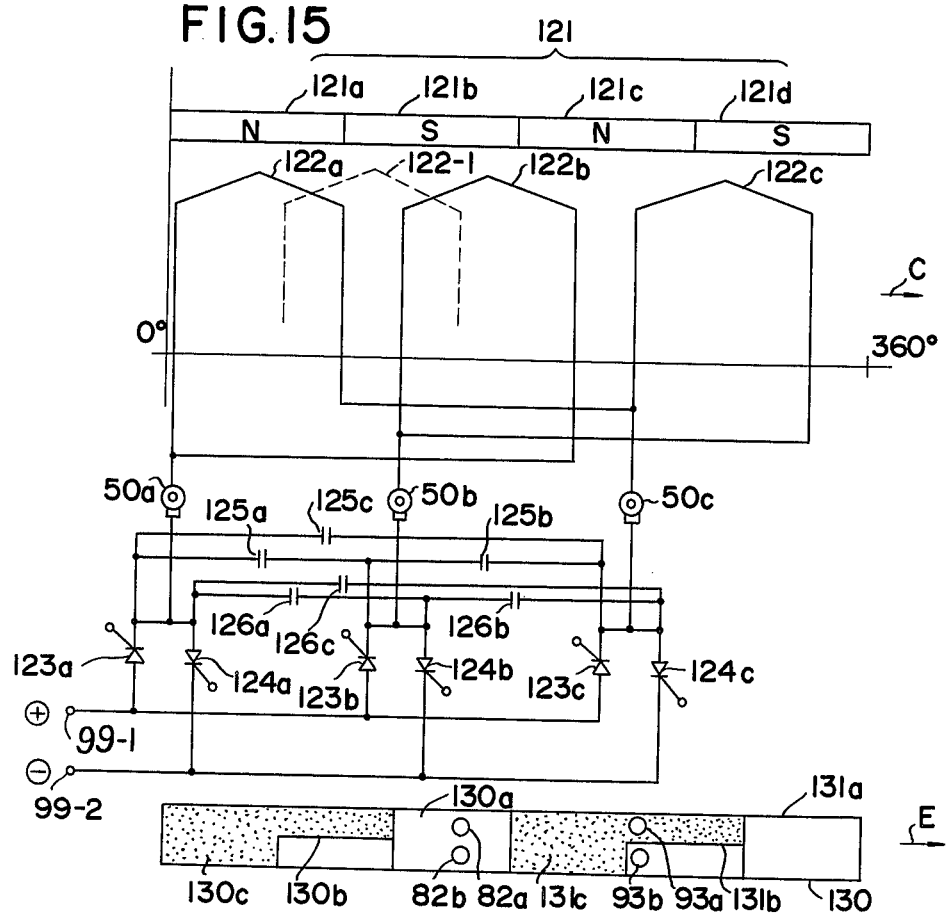
FIG. 15 is an expanded view of a field magnet and armature coils made by substituting thyristors for the transistors in FIG. 13.
Figure 16A:
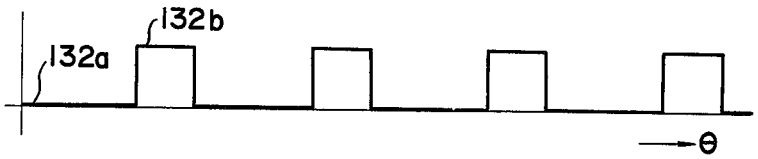
FIGS. 16a–16d show voltage wave forms of position detection signals according to another embodiment used in the motor of FIG. 10.
Figure 16B:
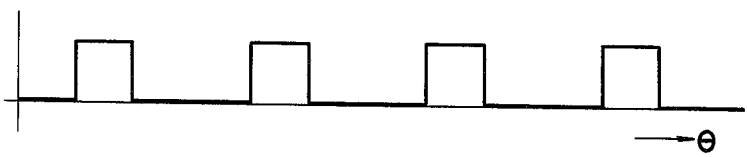
Figure 16C:
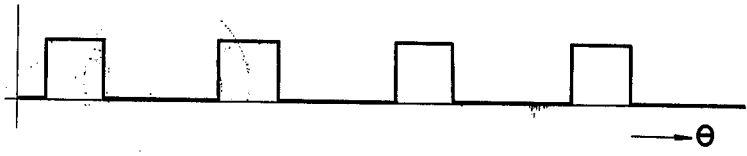
Figure 16D:
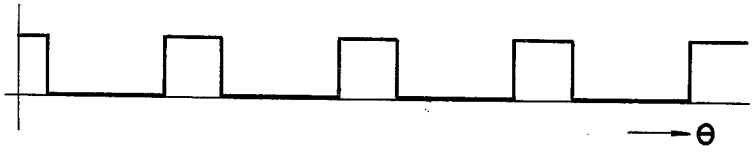

FIG. 1 is a sectional view of a disc type three-phase DC motor according to the invention. A rotating shaft 1 is supported by bearings 6-1, 6-2 in a casing 2, 3 made of press-formed soft steel. A commutator 8 and a disc-shaped coreless armature 5 are secured to the rotating shaft 1. A field magnet made of an annular ferrite magnet 4 is fixedly secured on the bottom of the casing member 3. There is a field air gap between the magnet 4 and the casing member 2, which is made of soft steel for closing the magnetic circuit of the magnet, in which air gap the armature 5 is located. Numeral 9 indicates brushes which slidably contact to the commutator 8. The brushes 9 are supported by a brush support 7, an end 7-1 of which support 7 projects outside of the DC motor as will be described in detail hereinafter.

FIG. 2 is a sectional view of a cup type three-phase DC motor according to the invention. A coreless armature 10 which is a cup-shaped member is constructed from armature coils which are arranged in a single layer into a cylindrical form and molded with plastic. A field magnet 11 is secured to an aluminum die-casting member 12. Oilless metals 13, 14 are bearings for a shaft 15, and are supported by aluminum die-casting member 12. A cylindrical member 20 is a spacer for sustaining the cup-shaped armature 10 from contact with the field magnet. Numeral 19 indicates a commutator. A casing 16 is made of soft iron and serves also to close the magnetic circuit of the field magnet. Brushes 17 is supported by a brush support 18. It is well known that the smaller the air gap between the field magnet 11 and the casing 16, the larger the strength of the magnetic field. According to the prior art, however, as the armature coil is in a double or triple superimposed form, the armature which is a cup-shaped member is thicker.

Consequently, according to the prior art, the air gap between the field magnet 11 and the casing 16 becomes larger, and the strength of magnetic field becomes smaller resulting in decreased efficiency as well as smaller torque with respect to a same amount of current. According to the invention, however, since the armature coils are arranged in a single layer into a cylindrical form and simply connected to one another, the cup-shaped member 10 constructed by molding the coils with plastic can be made thinner without difficulty.

The rotation of the motor will be described in connection with FIG. 3. FIG. 3 is an expanded view of a field magnet 27 corresponding to the field magnets 4 and 11 shown in FIGS. 1 and 2, and of armature coils 21, 22, 23 forming the armatures 5 and 10 shown in FIGS. 1 and 2, and of a commutator 28 which corresponds to the commutators 8 and 19 shown in FIGS. 1 and 2. In case of four-pole superimposed winding of the prior art, three-phase coils which are under the magnetic field by magnetic poles 27-1, 27-2 are the coils indicated by numerals 21, 23a, 22, and their terminals are connected to corresponding commutator pieces according to the process of superimposed winding. The above described superimposed winding arrangement is the most simple type, and the angular width of the commutator pieces is 2/3 of the angular width of the field magnet poles 27-1, 27-2, . . . Consequently, the coils are superimposed in double layers as shown by the figure. It is apparent that the number of layers of superimposed coils will increase further to three, four, . . . as the number of coils increases. In the construction according to the invention, however, the armature coil of one phase 23a is shifted by 180° in electrical angle rightward (in the figure) to the position of the armature coil 23. With this construction, since the direction of output torque does not change, the motor rotates in the same manner as the motor of superimposed winding construction. In this case, an armature coil which is under the field of magnetic poles 27-3, 27-4 is eliminated as a matter of course. The angular width of the conductors of the armature coils 21, 22, 23 which participate in the torque is 90° which is equal to the width of the magnetic pole, and the respective coils are arranged at equal angular intervals of 120° (as will be described in detail hereinafter in connection with FIG. 6). The winding end terminal 29b of the armature coil 21 is connected to the winding start terminal 31a of the armature coil 23, and the winding end terminal 31b of the armature coil 23 to the winding start terminal 30a of the armature coil 22, and the winding end terminal 30b of the armature coil 22 to the winding start terminal 29a of the armature coil 21. The terminals 29a, 30b are connected to commutator pieces 28-1, 28-4, and the terminals 29b, 31a to commutator pieces 28-2, 28-5, and the terminals 30a, 31b to commutator pieces 28-3, 28-6, respectively. The above described connection and arrangement of coils are substantially equivalent to a superimposed winding construction, and each of the armature coils is wound with the width equal to the width of field magnet pole, and so there can be realized a three-phase DC motor wherein torque is generated in the direction of arrows A, B to make the motor rotate. The motor of the above described construction has the advantageous features that a higher efficiency can be obtained because there is no mixing-in of counter-torque during rotation; that high mass productivity can be obtained because the armature coils 21, 22, 23 are arranged in a non-superimposed manner; and that because the armature according to the invention does not have silicon steel plate as used in the prior art, the cost can be greatly reduced. If a prior art two-pole three-phase motor is constructed in an axial-air-gap type (i.e. disc type), the armature coils are coils 21, 22a, 22, and superimposed on one another. If the width of the coil is reduced to avoid superimposition, there is naturally a mixing-in of counter-torque resulting in decreased efficiency, and practical usefulness will be lost. According to the present invention, however, such disadvantages are all eliminated. Further, according to the invention, the motor requires only three armature coils because of the four-pole construction of field magnet, otherwise, with the prior art superimposed winding, six armature coils should have been used. Consequently, according to the invention, the construction becomes simpler, and the ratio of the effective portion of the conductor of the armature coil with respect to torque to the non-effective portion (portion along the peripheral circle) becomes larger resulting in minimized copper loss. If the field magnet is of the two pole type as in the prior art, copper loss becomes extremely large. If the field magnet is of the six pole type, the construction of FIG. 3 wherein the armature coil 23a is shifted to the position of 23 cannot be realized, realization of the invention being impossible.

Brushes 32, 33 slidably contact with the commutator at an angular interval of 90°, which brushes being supplied with current from DC source terminals 32a, 33a respectively.

The armature coils 21, 22, 23 shown in FIG. 3 are, through their outlet terminals, connected to the corresponding commutator pieces 28-1, 28-2, ... in the same manner as in the superimposed winding. The same effect can also be obtained by the connection shown in the expanded view of FIG. 4. That is, the connection of FIG. 4, is the connection wherein the armature coils 21, 22, 23 in FIG. 3 are turned over, as can be understood by comparing the outlet terminal numerals 29a, 29b, 30a, 30b 31a, 31b in FIG. 3 with those in FIG. 4. However, the current flow under the N-S magnetic field in FIG. 4 is in the opposite direction to that in FIG. 3, and accordingly the motor rotates in the opposite direction as shown by arrows A, B in FIG. 4. The connection of armature coils in FIGS. 3 and 4 is a delta connection. The invention can also be realized by a Y-connection. In this case, in FIG. 3 the terminal 29a is connected to the commutator pieces 28-1, 28-4, the terminal 31a to the commutator pieces 28-2, 28-5, the terminal 30a to the commutator pieces 28-3, 28-6, and the terminals 29b, 30b, 31b become a common terminal.

FIG. 5 is an expanded view of the armature coils, field magnet and comutator in the motors of FIGS. 1 and 2, wherein the field magnet 34 consists of N, S magnetic poles each having an angular width of 45° (8 poles). In this case, since the current supply for the armature coils 35-1, 35-4, coils 35-2, 35-5, and coils 35-3, 35-6 may be of the same phase, the respective coils are connected in series to each other to form three-phase armature coil groups. These three-phase armature coil groups are connected in ring-shape (delta type), their connection points being connected to commutator pieces 36-1, 36-2, 36-3 respectively. Commutator pieces 36-1, 36-4, 36-7, 36-10, pieces 36-2, 36-5, 36-8, 36-11, and pieces 36-3, 36-6, 36-9, 36-12 are interconnected respectively through conductors. The angular width of the commutator pieces is two-thirds of the width of field magnet pole, i.e. 30°. The principle of rotation by Fleming force is the same as in FIG. 3, therefore the explanation is omitted here. The performance is similar to that in FIG. 3, and so is the effect. Between the number of field magnet poles 2n (n being an integer) and the number of armature coils there is a relation that the number of armature coils is 3n/2. The angular width of the commutator pieces is two-thirds of the width of the field magnet pole. The angular width of the sectorial armature coil is equal to the width of the field magnet pole. The three-phase the armature coils are arranged on the surface of armature at equal angular intervals and not superimposed on one another (as will be described in detail hereinafter in connection with FIG. 7).

In the above described embodiment, the three-phase armature coils are connected to one another in ring shape (delta type), but Y-type connection can also be used.

It is apparent that the above described embodiment is applicable to both disc-type motors and cup-type motors.

Numerals 37-1, 37-2 indicate brushes, the brush 37-1 are connected to the positive terminal 38-1 of the source, and the brush 37-2 to the negative terminal 38-2.

FIG. 6 is a top view illustrating the arrangement of coils in an armature used in the motor of FIG. 1 comprising three armature coils.

Three armature coils 21, 22, 23, made of ribbon conductor which has been hoop-wound and formed into a sectorial shape, are placed in position and molded with plastic into a disc shape. Dotted line shows the position of the field magnet. As shown by the angular value numerals in the figure, each armature coil has an angular width of 90° between both radial sides of the conductor. This width is equal to that of the magnetic pole, and these three coils are arranged at intervals of 120°. By such arrangement, the armature coils are arranged in a single layer, and accordingly, the thickness of the armature can be minimized, the air gap between the armature and the field magnet can be minimized, and the strength of the magnetic field can be much larger resulting in large starting torque and a high efficiency motor.

FIG. 7 is a top view illustrating the arrangement of coils in an armature used in the motor of FIG. 1 with six armature coils.

Numeral 41 indicates a rotating shaft of the disc-shaped armature 40. Six armature coils 42, 43, 44, ... made of ribbon conductor, which has been hoop-wound and formed into a sectorial shape, are located in position and molded with plastic into a disc shape. Each of the armature coils 42, 43, ... has an angular width of 45° between both radial sides of the conductor, which angular width is equal to that of magnetic poles 49, 50, ...

FIG. 8 illustrates a disc-shaped field magnet associated with the armature of FIG. 7. A fixed field magnet 48 is of annular shape consisting of eight magnetic poles. Each of the magnetic poles 49, 50, ... has an angular width of 45°. Facing this magnet, there is a soft steel disc (the casing 2 of FIG. 1) to form magnetic path.

FIG. 9(a) and FIG. 9(b) shows a cup-shaped armature. A coil of the armature, as shown in FIG. 9 (b), is made by hoop-winding ribbon conductor (0.5 mm in thickness and 1.5 mm in width), heat treating for forming, and forming into a rectangular shape. This forming is performed by using a mold. As the conductor is of ribbon shape and flexible, the forming is very easy. The coil is further curved a little so that it may closely fit a cylindrical surface. Numerals 58-1, 58-2 indicate terminals. Six of such armature coils 58a are arranged in a form shown by FIG. 9 (a), and molded with plastic into an armature 57. Aperture 57a is for the purpose of fixing a rotating shaft 73 (FIG. 10) together with a rotor 81. As shown in the figure, the armature coils are arranged on the armature 57 without superimposition on one another. This armature is provided with three-phase armature coils. In the prior art, such armature coils are superimposedly arranged in three or two layers. According to the invention, however, the coils are arranged in a single layer, which is effective to reduce the air gap. This arrangement is also effective to generate larger torque resulting in higher efficiency because the wire winding density can be higher.

FIG. 10 shows a cup type motor realized by using semiconductors for the cup type motor of FIG. 2. An aluminum cylinder 71 is fixed with its leftward end to a die-casting casing 70, a rotating shaft 73 is supported by ball bearings 72a, 72b provided in the cylinder 71, and a pulley 74 is secured to the shaft 73. A cylindrical ferrite magnet 75 is secured to the cylinder 71 by encircling the cylinder 71. A cup-shaped armature 57 is secured to the right end of the rotating shaft 73. A cylindrical casing member 75-1 is secured to the casing 70. To the right end of the rotating shaft 73 there is provided a slip ring assembly 77 which slidably in contact with three brushes provided to a support 78. The support 78 is secured to the casing member 75-1. To a support 79 secured to the right end of the casing 70 there is provided an oscillation coil 82 which faces rotor 81 with a small air gap therebetween. The rotor 81 is secured to the right end of the armature 57. A cylindrical soft steel ring 70a is secured to the inner surface of the casing 70 to form magnetic path for the field magnet.

FIG. 11 illustrates in detail the slip ring assembly 77 used in the motor of FIG. 10. About an extension portion 73b at the right end of the rotating shaft 73 there are three copper tubes with a plastic material 73c interposed therebetween to form slip lings 77a, 77b, 77c. These three copper tubes for the slip rings may be made by providing a single long copper tube to the extension portion 73b and then cutting the tube by a cutter into three pieces. Lead wires 77-1, 77-2, 77-3 are led out from these slip rings respectively. The brushes mentioned in connection with FIG. 10 slidably contact with the slip rings 77a, 77b, 77c. As may be known from the above described construction, the slip rings 77a, 77b, 77c are formed to be nearly equal in diameter to the rotating shaft 77. Consequently, friction loss is smaller, mechanical noise is smaller because of reduced sliding speed of contact, and abrasion of the parts is reduced.

The oscillation circuit for position detection used in the motor shown in FIG. 10 is shown in FIG. 12. A coil 82a is an air-core coil as shown in FIG. 12 (c) which is about 5 mm in diameter and about 2 mm in thickness. The unit also uses a coil 82b, similar to coil 82a. The coils 82a and 82b are connected in series to each other to form an oscillation coil assembly, and constitute a Colpitts oscillation circuit together with a transistor 83. A Zener diode 84 is connected in parallel to the Colpitts circuit to make the voltage uniform which is supplied through source terminals 13-1, 13-2 to the Colpitts circuit. The oscillation output of the Colpitts circuit is smoothed by a smoothing circuit including a capacitor 85 and is supplied as a direct current output through a terminal 86. When a soft steel plate is placed close to the magnetic path open ends of the coils 82a and 82b, oscillation output will greatly decrease because of the hysteresis loss and eddy current loss, and in some cases oscillation may stop. Oscillation frequency of about 500 kHz to 1 MHz is preferred. When a soft steel plate is close to only the coil 82b, the strength of output oscillation decreases to a half value. A graph in FIG. 12 (b) illustrates the wave form of the above described oscillation output at terminal 86. In the graph, portion 87a shows the output at the time when a soft steel plate is close to both coils 82a, 82b; portion 87b when a soft steel plate is close to only the coil 82b; and portion 87c when a soft steel plate is away from both coils. The abscissa represents the rotation angle $\theta$ of the armature 57. Such position detection signals are generated by the rotor 81 of FIG. 10. The rotor 81 rotates together with the rotation of the armature 57 to effect loss at the oscillation coil 82 (consisting of 82a and 82b).

Details of the above will be described in connection with an expanded view of FIG. 13. Numeral 81 in FIG. 13 corresponds to the rotor 81 of FIG. 10. Dotted portions indicate punched out portion by press processing. The angular width of each steps 91a-1, 91a-2, 91a-3 is 30°, which is equal to a third of the angular width of one set of N,S field magnetic poles. Stepped portion 91a and like portions of similar construction as 91a indicated by numerals 91b, 91c, 91d constitute a control band. The coils 82a, 82b are arranged in the direction perpendicular to the longitudinal direction of the expansion of the rotor 81. During the rotation of the rotor 81 in the direction of arrow B, when the coils 82a, 82b come to face the step 91a-1 the oscillation output disappears. With a further 30° rotation of the rotor 81, the coil 82b comes to the under side of the step 91a-2 to produce eddy current and hysteresis losses, the coil 82a coming to the upper side of the step 91a-2 where there is no punching out and therefore no loss, and consequently the strength of the oscillation output is one-half of the maximum value. With a further 30° rotation, the coils 82a, 82b come to the step 91a-3, and there is no loss, the strength of the oscillation output being the maximum. Accordingly, the graph having three steps as shown in FIG. 12(b) can be obtained. Thus, a three-step oscillation output can be obtained for every 90° rotation of the rotor 81. Another set of coils 93a, 93b is provided against the rotor 81. There is provided another oscillation circuit containing these two coils, which is the same as the circuit of FIG. 12. Angular interval between the coils 82a, 82b and the coils 93a, 93b is 45° which is equal to the width of one pole of the field N,S magnet poles. The oscillation circuit containing the coils 93a, 93b also has a three-step output similar to the graph of FIG. 12(b). The current supply control for the armature coils controlled by the above described position detection output is as follows. A field magnet 94 shown in FIG. 13 consists of N,S magnetic poles 94a, 94b, . . . , the angular width of each magnetic pole being 45°. The armature coil is the same as shown in FIG. 9(b), the angular width between both sides of conductor being 45° which is equal to the angular width of magnetic pole. Armature coils 95a, 95b, . . . are arranged at equal angular intervals covering 360°. In a three-phase armature of the prior art, there is provided a coil 95-1 as shown by dotted line. According to the invention, however, an armature coil 95c is provided in place of the coil 95-1. This substitution is possible because they correspond to the same portion of the phase with respect to the field magnet. Thus, three-phase armature coils can be arranged and not be superimposed one on the other. This is the same also for armature coils 95d, 95e, 95f. The armature coils are connected to one another by means of wave winding. Three lead wires are provided to respective connection points of the coils, and are led out through slip rings 96a, 96b, 96c respectively to be connected to external transistors 97a, 97b, . . . , 98a, 98b, . . . in both forward and reverse directions as shown by the drawing. When the transistors 97a, 97b, 97c become conductive positive voltage is applied from the source, and when the transistors 98a, 98b, 98c become conductive negative voltage is applied. Conduction control for the transistors 97a, 97b, 97c is performed by the output from the oscillation circuit containing the coils 82a, 82b, and conduction control for the transistors 98a, 98b, 98c is performed by the oscillation circuit containing the coils 93a, 93b. Details of these controls are shown in FIG. 14(a) and 14(b).

In FIG. 14(a), the output power from the terminal 86 in FIG. 12 is applied to a terminal 100. The collector and the emitter of a transistor 102 are connected to the positive and negative terminals 99-1 and 99-2 of the source, and the base is connected to the positive terminal 99-1 through a resistor 101. An output terminal 102a is led out from the collector of the transistor. The collector and the emitter of a transistor 103 are connected to the positive and the negative terminals 99-1 and 99-2 respectively, and the base is connected to the terminal 100 through a diode. An output terminal 103a is led out from the collector of the transistor 103. Similarly, the collector and the emitter of a transistor 104 are connected to the positive and the negative terminals 99-1 and 99-2 of the source respectively, and the base is connected to the terminal 100 through two series-connected diodes 106. An output terminal 104a is led out from the collector of the transistor 104. Diodes 105a, 105b, 105c are connected between the transistors 102, 103, 104.

In operation, when no input is applied to the terminal 100, that is, when the coils 82a, 82b face step 91a-1 of the rotor 81 as shown in FIG. 13, the transistor 102, with its base being supplied with current through the resistor 101, is conductive. The transistors 103, 104 are non-conductive. When the medial value input is applied to the terminal 100, that is, when the coils 82a, 82b face the step 91a-2 of the rotor 81 of FIG. 13, the transistor 103, with its base being supplied with current, becomes conductive. Consequently, the base voltage of the transistor 102 is decreased through the diode 105a to keep the transistor 102 non-conductive. Then, when the coils 82a, 82b face the step 91a-3, the maximum value input is applied to the terminal 100 and the transistor 104, with the base being supplied with current against the shift voltage of the diode 106, becomes conductive. Consequently, the transistors 102, 103 are kept non-conductive through the diodes 105c, 105b. As is understood from the above description, voltages at the terminals 102a, 103a, 104a decrease in turn in a cyclic manner for every 30° rotation of the rotor 81. Since the terminals 102a, 103a, 104a are connected to the bases of the transistors 97a, 97b, 97c of FIG. 13 respectively, these transistors become conductive in turn in a cyclic manner. The output of the oscillation circuit containing the coils 93a, 93b is applied to a terminal 107 shown in FIG. 14(b). The circuit of FIG. 14(b) is substantially the same in construction as the circuit of FIG. 14(a) and a description thereof is omitted here. In operation, when the coil 93a, 93b face the step 91a-2 as shown in FIG. 13, input at the terminal 107 takes the medial value, and so a transistor 108, with its base being supplied with current, becomes conductive. Consequently, a transistor 109 becomes conductive resulting in the increase of voltage at a terminal 109a. At this time, a transistor 111 is kept non-conductive through a diode 110a. When the coils 93a, 93b face the step 91a-3 with the rotation of the rotor 81, the input at the terminal 107 takes the maximum value, and so a transistor 110, with its base supplied with current against the shift voltage of a diode 112, becomes conductive resulting in increase of voltage at a terminal 113a. The transistors 111, 109 are kept non-conductive through diodes 110b, 110c. When the coils 93a, 93b comes to face the step 91a-1 of the stepped portion 91d with further rotation of the rotor 81, the oscillation output becomes extinct resulting in no input to the terminal 107. Consequently the transistors 109, 113 become non-conductive, and the transistor 111, with its base being supplied with current through a resistor 112, becomes conductive resulting in the increase of voltage at a terminal 111a. The terminals 111a, 109a, 113a are connected to the bases of the transistors 98a, 98b, 98c of FIG. 13 respectively, and so these become conductive in turn in cyclic manner with the rotation of the armature in the direction of arrow A. Since the manner of the above described current flow is similar to that in the case of a wave-winding armature utilizing a commutator and brushes, a DC motor is realized wherein the armature rotates by Fleming force in the direction of arrow A due to the field magnet. Windings similar to lap winding can also be used. Position detection output requires six different modes. The output obtained from two sets of oscillation coils is divided into six modes, and so the motor is economical, and control with large S/N ratio can be effected because of large oscillation output as much as several mA at the terminal 86 (FIG. 12). The air-core coils 82a, 82b, ... are small in size and of cost less. Furthermore when the oscillation outputs from the circuit containing the coils 82a, 82b and from the circuit containing coils 93a, 93b are interchangedly supplied to terminals 100, 107 in FIG. 14 by using a changeover switch, the rotation of the motor is reversed. Consequently the current to be changed over can be small, and the reverse rotation of a semiconductor motor, which is generally difficult, can be easily effected by using a changeover switch.

Series-connected capacitor 114 and diode 105a are connected to the terminal 100 and the base of the transistor 104. Similarly, series-connected capacitor 115 and diode 115a are connected to the terminal 107 and to the base of the transistor 110. The effect of these capacitors 114, 115 and the diodes 105a, 115a is as follows. During the generation of the output signal of the graph shown in FIG. 12(b) with the rotation of the rotor 81 of FIG. 13, at a portion 87d where the output value changes from the maximum to the minimum, the output changes passing through a point the value at which is equal to that at the portion 87b. At the time of such output change, the transistors 103, 109 in FIG. 14 become temporarily conductive resulting in an erroneous position detection signal, and reverse torque is produced. Also, if the coils 82a, 92b happen to be on a portion D of the rotor 81 (FIG. 13) at the time of start of motor, signal of the medial value is generated and consequently a reverse torque is produced resulting in a vibration which make it difficult to start rotation. For such problems, capacitors 114, 115 in FIG. 14 are provided. The effect for FIG. 14(b) is the same as that for FIG. 14(a), and so explanation for FIG. 14(a) only will be given. Suppose the coils 82a, 82b are in the portion D (FIG. 13) at the time of start, medial value signal will be generated, but since the input power due to this signal makes the transistor 104 conductive through the diode 105a and capacitor 114, forward torque is produced to start rotation. At this time, the transistor 103 is kept non-conductive through diode 105b. During the rotation, when the coils 82a, 82b comes to the step 91a-2 of the rotor 81, medial value single input power is applied from the terminal 100, but, this input power does not make the transistor 104 conductive through the already charged capacitor 114 and only makes the transistor 103 conductive, and so there is no obstruction. If the coils 82a, 82b happen to be on the step 91a-2 of the rotor 81 at the time of start, the transistor 104 becomes temporarily conductive to produce reverse torque, but the transistor 104 rapidly becomes non-conductive with the capacitor 114 being charged, and the transistor 103 becomes conductive to make the motor start, and so there is no obstruction.

During the rotation of motor, medial value signal is generated when the coils 82a, 82b pass through the portion D of the rotor 81 of FIG. 13. At this time, the transistors 97b, 98b in FIG. 13 temporarily become conductive at the same time resulting in undesirable short-circuiting of the source. To avoid this inconvenience in FIG. 14(a), there is provided between the base of the transistor 104 and the negative source terminal 99-2 a capacitor 120 of small capacity to keep the transistor 104 conductive for a while in spite of extinction of input power at the base of the transistor 104 (through the diode 106) and to keep the transistor 103 non-conductive through the diode 105b. Thus, the transistor 103 is prevented from becoming non-conductive due to the temporary medial value signal generated when the coils 82a, 82b pass through the portion D of the rotor 81, and the above described inconvenience can be avoided. Similar means can be adopted also for the control circuit of FIG. 14(b). The capacitor 120 serves as a memory element which memorizes that the transistor 104 becomes conductive. Accordingly, other means such as SCR (silicon controlled rectifier) of small size or a flip-flop circuit, for example, can also be adopted.

In the embodiment of FIG. 13, there are two sets of coils, one set comprising the coils 93a, 93b, and another set comprising the coils 82a, 82b. However, by constucting a Colpitts circuit with two coils each selected from the above two sets respectively, making the oscillation coil larger in diameter, making the widths of the steps 91a-1, 91a-2, 91a-3 smaller, and making the diameter of the coil nearly equal to the width of the dotted portion (punched out portion), a similar position detection signal as shown in the graph of FIG. 12(b) can be generated. Thus, the desired object can also be attained by using one of the coils 82a, 82b and one of the coils 93a, 93b. While there are provided eight field magnet poles and six armature coils in the expanded view of FIG. 13, in the view of FIG. 15 there are provided three armature coils 122a, 122b, 122c, each having an angular width of 90° between both sides of the conductor, which angular width being equal to the angular width of magnetic poles 121a, 121b, 121c. Numeral 121 indicates a field magnet. In case of prior art three-phase armature coils, there is provided a coil indicated by dotted line 122-1. In the present invention, however, this coil 122-1 is shifted to the right to be coil 122c, and accordingly three coils are arranged on the armature without being superimposed on one another. Other similar numerals indicate like parts as in FIG. 13, and so the explanation about them is omitted here. In place of the transistors 97a, 97b, 97c, 98a, 98b, 98c in FIG. 13, there are provided SCRs (silicon controlled rectifiers) 123a, 123b, 123c and 124a, 124b, 124c which are connected to the positive and negative source terminals 99-1, 99-2 in the forward/reverse directions. Numerals 125a, 125b, 125c, and 126a, 126b, 126c indicate commutation capacitors. To the gates of the SCRs 123b, 123c, 123a, there are applied power obtained by commutating the output at the terminals 102a, 103a, 104a in FIG. 14 to positive pulse outputs through a differentiation circuit (not shown). To gates of SCRs 124c, 124a, 124b, there are applied power obtained by commutating the output at the terminals 109a, 113a, 111a to positive pulse outputs through a differentiation circuit (not shown). A rotor 130 in FIG. 15 is similar in construction to the rotor 81 in FIG. 13 except that the angular width of steps 130a, 130b, 130c and 131a, 131b, 131c which constitute the control band is 2/3 of the width of the field magnet poles 121a, 121b, ... Since the control circuits of FIG. 14(a) and 14(b) are driven by the oscillation circuit containing the coils 82a, 82b and 93a, 93b, the armature coils 122a, 122b, 122c, with their current supply being controlled, rotate due to the Fleming force in the direction of the arrow C by the energizing of SCRs 123a, 123b, ... Consequently, the rotor 130 rotates in the direction of arrow E synchronously with the armature and generates successive rotating torque. The performance and effect are the same as those in the case of FIG. 13.

Graphs of FIG. 16 show the voltage wave forms of position detection signals according to another embodiment used for the motor of FIG. 10. Portion 132a corresponds to the time when a soft steel plate comes close to a coil 134a (FIG. 17), and portion 132b when a soft steel plate is away from the coil 134a. The abscissa represents the rotation angle $\theta$ of the armature 57 (FIG. 10). Such a position detection signal is generated by a rotor 136 (a substitution for the rotor 81 in FIG. 10) of FIG. 17. The rotor 136 rotates together with the armature 57 to produce loss in an oscillation coil 134. The details will be explained referring to the expansion view of FIG. 17.

Dotted portions indicate punched out portions by punch press processing. Angular width of the portion indicated by numeral 137a-1 is 30°. Angular width of the portion indicated by numeral 137a-2 is 60°. The angular width of one portion indicated by numeral 137a-1 is one third of the angular width of a set of N-S magnetic poles of a field magnet. Coils 134a, 134b are arranged at an angular interval of 60°. When the coil 134a comes to face the portion 137a-2 with the rotation of the rotor 136 in the direction of arrow B, the signal output becomes extinct resulting in the portion 132a in the signal wave form of FIG. 16 line (a). When the coil 134a comes to face the portion 137a-1 with a further rotation of the rotor 136 in the direction of arrow B, signal output is generated resulting in the portion 132b in the a signal wave form of FIG. 16 line (a). Accordingly, with the rotation of the rotor 136 in the direction of arrow B, the signal wave form of FIG. 16 line (a) is obtained from an oscillation circuit containing the coil 134a. In the like manner, the signal wave form of FIG. 16 line (b) is obtained from an oscillation circuit containing the coil 134b. A signal wave form of FIG. 16 line (c) is obtained from an oscillation circuit containing a coil 134c. A signal wave form of FIG. 16 line (d) is obtained from an oscillation circuit containing a coil 134d. There is a phase difference of 60° between the signal wave form of FIG. 16 line (a) and the signal wave form of FIG. 16 line (b). Between the signal wave forms of FIG. 16(a) and FIG. 16(c), there is a phase difference of 45° which is equal to the width of the N-S magnetic poles of the field magnet. There is a phase difference of 45° between the signal wave forms of FIG. 16 line (b) and FIG. 16 line (d). The signal of the wave form of FIG. 16 line (a) is applied to a transistor 140a in FIG. 18, and the signal of wave form of FIG. 16 line (b) is applied to a transistor 140b in FIG. 18. Accordingly, as is apparent from FIG. 16, the transistors 140a, 140b become ON when the input signals take a high voltage. When either of the transistor 140a or 140b is ON, current which otherwise may flow toward the base of transistor 140c flows through the transistor 140a or 140b, and so the transistor 140c is OFF. When both transistors 140a and 140b are OFF, however, the transistor 140c becomes ON with its base being supplied with current through a resistor 142. That is, at the time when the signal of wave form of FIG. 16 line (a) takes high voltage the transistor 140a becomes ON, when the signal of wave form of FIG. 16 line (b) takes high voltage the transistor 140b becomes ON, and when both signals of wave forms of FIG. 16 lines (a) and (b) are not at high voltage the transistor 140c becomes ON. These are repeated in cyclic manner.

On the other hand, the signal of wave form of FIG. 16 line (c) is applied to a transistor 144a in FIG. 18, and the signal of wave form of FIG. 16 line (d) is applied to a transistor 144b in FIG. 18. Accordingly, as is apparent from FIG. 16, the transistors 144a, 144b become ON when the input signals are high voltage. When either of the transistors 144a or 144b is ON, current which otherwise may flow toward the base of transistor 144c flows to earth through transistor 144a or 144b, and so the transistor 144c is OFF. When both transistors 144a and 144b are OFF, however, the transistor 144c becomes ON with its base being supplied with current through a resistor 143.

That is, at the time when the signal of wave form of FIG. 16 line(c) takes high voltage the transistor 144a becomes ON, when the signal of wave form of FIG. 16 line (d) takes high voltage the transistor 144b becomes ON, and when both signals of wave forms of FIG. 16 lines (c) and (d) are not at high voltage the transistor 144c becomes ON. These are repeated in cyclic manner. When the transistor 144a is ON, a transistor 145a becomes ON. When the transistor 144b is ON, a transistor 145b becomes ON. When the transistor 144c is ON, a transistor 145c becomes ON. Accordingly, as the transistors 144a to 144c become conductive in turn in a cyclic manner, the transistors 145a to 145c also becomes conductive in turn in a cyclic manner.

Since the current flows in accordance with the principle described, there is a difference of 180° in electrical angle between the currents of transistors 145a and 140a. Similarly, there is a difference of 180° in electrical angle between the currents of the transistors 145b and 140b, and a difference of 180° in electrical angle between the currents of the transistors 145c and 140c. Armature coils 146, 147, 148 in FIG. 8 are of delta connection. Reverse rotation can be effected by shifting the phase of coil for position detection.

FIG. 19 illustrates the arrangement of the field magnet poles and the brushes in the motor of FIG. 1.

A ferrite magnet 150, as shown in the figure, consists of N and S magnetic poles 150-1, 150-2, . . . , each having an angular width of 90°, constituting field magnet poles.

In a center aperture of the field magnet 150, there is rotatably provided a cylindrical plastic molding member 151 (constituting a support for brushes 153-1, 153-2). The brushes 153-1, 153-2 slidably contact with a commutator 152.

A noise filter and a method of arrangement thereof according to the invention will be described hereinbelow. As can be understood from the view of FIG. 3, the amount of current flow and the direction thereof in the armature coils 21, 22, 23 change with the rotation of the rotor. Inductance is small because the coils are coreless. But, high voltage generated when accumulated energy is discharged due to the above described changes in the current may cause electrical noise and damage of the commutator and brushes. Such high voltage can be prevented by conventional means such as capacitors and varistors connected in parallel to respective armature coils. But, in prior art motors, especially in motors of the flat type and small size comprising well known lap windings or wave windings, there is no space for receiving them in the motor. In the motor according to the invention, however, there are empty cavities at the center portions of the armature coils 21, 22, 23, wherein there can be embedded elements such as capacitors or varistors as shown by numerals 24, 25, 26 in FIG. 20.

These elements 24, 25, 26 are connected in parallel to the armature coils 21, 22, 23 respectively.

FIG. 20 illustrates in detail such armature as mentioned above. Referring to FIG. 20(a), an armature 160 is of disc shape and has three armature coils embedded therein by molding as shown in FIG. 20(b). The periphery portion 160a of the disc projects a little from the disc plane. By embedding a ring of the die-casting in this periphery portion during the formation thereof, larger inertia can be obtained, which is effective for reducing torque ripple in the motor of the invention which is designed for a magnetic recording/reproducing apparatus application. Further, balancing can be easily effected by providing holes in the die-casting ring. In a conventional motor of axial air gap type, it is difficult to provide additional material for rotation balance since the air gap is limited. In the motor of the invention which is provided with the projection as indicated by numeral 160a, however, it is easy to effect balance by cutting away a part of the projection or by adding other material thereto. Brushes 161, 162, with their roots fixedly secured to a plastic ring 163, are provided at an angular interval of 90°. The brushes 161, 162 are received in the central cavity of the magnet, which contributes to make the motor flat and smaller in size.

As shown in FIG. 20(b), the armature coils are of sectorial shapes and are not superimposed with respect to one another. Each of armature coils 166, 167, 168 is of the same shape, and the angular width thereof effective to torque is 90°, being equal to the width of the field magnet pole. The armature coils can be mass-produced by hoop-winding thin wire about 200 turns and heat treating to rigidify. The armature coils are about 1 mm in thickness, and accordingly the armature 160 is of similar thickness. Consequently the air gap where the field magnet exists can be designed small resulting in high efficiency. The armature coils 166, 167, 168 are arranged at angular intervals of 120°.

FIG. 21 illustrates reversing means for the above described commutator motor. Conventional commutator motors can be reversed in rotation by changeovering the polarities of applied voltage, but have drawbacks that the motor is large in size and expensive because of a large number of circuits for changeover switch means and that contact troubles may often occur. In the motor of the invention, reverse rotation can be easily effected by rotating the brushes 9 in FIG. 1 by 90° in case of the construction of FIG. 5, so that the motor is subjected to a Fleming force under reversed magnetic field. Thus, the drawbacks in the prior art are eliminated. This is illustrated in FIG. 21. Here, the brushes in FIG. 1 are rotated by 90°. FIG. 21 is the back view of the motor of FIG. 1. In the casing 3 there is provided an arc-shaped perforation 194 through which protrudes outward the lower end projection 7-1 of the cylinder 7 that is the brush support (FIG. 1). The projection 7-1 is elastically biased by a spring 193 rotated counterclockwise to abut against the left end of the perforation 194. A lever 191 is slidably supported by supports 191-1, 191-2 provided on the casing 3. When used as a capstan motor in a magnetic recording/reproducing apparatus for example, reverse rotation of the motor is needed for return winding operation. A mechanism for return winding is indicated by numeral 192. The lever 191 is so provided as to be moved in the direction of arrow E in connection with the operation of the mechanism 192. Accordingly, with a directive of return winding, the projection 7-1 which has been in abutment with a portion 191a rotates by 90° along the arc of the perforation 194, and the reverse rotation of the motor is effected. When the mechanism 192 comes back to the original position, the lever 191 comes back to its original position by the biasing force of the spring 193, and the motor rotates in the forward direction again. In place of the lever 191, a nylon thread connected to the projection 7-1 can be used to carry out the above described operation.

As is apparent from the above description, according to the manner of arrangement of armature coils of the invention, the thickness of armature can be several times less than the thickness of prior art coil-type armature, without need of any special processing of winding ends of coils. Accordingly, the air gap between the field magnet and the armature can be smaller, and the strength of the magnetic field can be much larger, and consequently a motor having higher starting torque and higher efficiency can be realized. Further, by making the armature current flow region 2/3 of the width of field magnet pole, higher efficiency can be obtained. Further, since the armature for a disc- or cup-type motor is coreless, there is no loss due to eddy current and hysteresis and inductance is small, and consequently better rectifying characteristic can be obtained. Further, the inertia of the armature is small and the weight of the body is extremely small, and consequently higher efficiency can be obtained. Also, in the armature according to the invention, the armature coils which rotate against the field magnet poles are not superimposed with respect to one another and at equal intervals, and there is no mixing-in of reverse torque which may take place in a conventional three-phase motor of axial air gap type (disc type), and consequently high efficiency (50% or more) can be maintained. Accordingly, the armature is easy to mass produce resulting in a lower cost of motor. Further, the armature coils constituting three-phase armature coils have an angular width equal to the width of the field magnet pole and are arranged at equal intervals, and consequently there is an ample empty space in the central portion of each of the coils. This empty space can receive a capacitor or a varistor, and reduction of electrical noise as well as smaller inductance in in the armature coil can be effected, and the duration of the commutator and brushes can be increased.

It is to be understood that various changes and modifications can be made without departing from the spirit and scope of the invention.

What is claimed is:

1. In a coreless DC motor comprising a fixed field magnet (27, 121) having four magnetic poles of N and S magnetized in equal angular widths; a magnetic material (2, 3, 12, 16, 70, 75-1) for closing magnetic paths of said field magnet; a rotating shaft (1, 15, 73) supported by bearings provided to a central portion of said magnetic material; an armature (5, 10, 57) of one of disc- and cylindrical-shapes secured to said rotating shaft so as to be rotatable in said magnetic paths to face against said field magnet poles; three-phase armature coils of lap winding arranged on said armature; and electric circuit means interconnecting said three-phase armature coils in a manner selected from the class consisting of delta-connection and Y-connection for supplying current to said coils, the improvement wherein: said three-phase armature coils comprise three windings (21, 22, 23, 122a–c) each arranged at equal angular interval so as to be non-superimposed with respect to one another on the armature by shifting the coil (23a, 122-1) of one-phase by 180°; each of said coils having an angular width equal to that of said field magnet pole.

2. A motor as set forth in claim 1 comprising:
   (a) commutator means secured to said three-phase armature coil means and to said rotating shaft including positive and negative terminals;
   (b) two brushes slidably contacting to said commutator means at an angular interval equal to the width of said field magnet pole, said two brushes being supplied with current from said positive and negative terminals;
   (c) first to ninth commutator pieces arranged on said commutator means at angular intervals of 2/3 of the width of said field magnet poles;
   (d) conductor means for interconnections of a first group consisting of said first, fourth and seventh commutator pieces, of a second group consisting of said second, fifth and eighth commutator pieces, and of a third group consisting of said third, sixth and ninth commutator pieces; and,
   e) terminal means for supplying said three-phase armature coil means with current through said three groups of commutator pieces.

3. A motor as set forth in claim 1 comprising:
   (a) a current supply control circuit including slip rings, semiconductor switching elements and source terminals, having three lead wires led out from the three connection points of said three-phase armature coil means through three slip rings, each of said three lead wires being connected to two semiconductor switching elements in the forward/reverse directions, said semiconductor elements being connected in the forward direction to positive and negative source terminals respectively;
   (b) a control rotor synchronously rotating with said armature;
   (c) control band means provided on the periphery of said rotor, said control band means having a plurality of steps effecting different eddy current losses, the width of each said steps being two-thirds of the width of said field magnet poles;
   (d) a first oscillation circuit containing a first oscillation coil provided against said control band means;
   (e) a second oscillation circuit containing a second oscillation coil provided at a predetermined distance from said first oscillation coil;
   (f) an electric circuit for generating three detection outputs of a first position through the output of said first oscillation circuit in accordance with said steps of said control band means; an electric circuit for generating three detection outputs of a second position through the output of said second oscillation circuit in accordance with said steps of said control band means; and,
   (g) a control circuit means for energizing through said three detection outputs of said first position said semiconductor switching elements connected to said positive source terminal respectively and for energizing through said three detection outputs of said second position said semi-conductor switching elements connected to said negative source terminal respectively.

4. A motor as set forth in claim 1 with positive and negative source sides having:
   (a) two series of position detection means comprising two groups of position detection elements for a first position; two groups of position detection elements for a second position which elements being shifted in phase by an amount corresponding to the width of said field magnet poles with respect to respective position detection signals of said groups of position detection elements for said first position;
(b) three groups of semiconductor switching elements connected in series between said coils and the positive side source;
(c) three groups of semiconductor switching elements connected in series between said armature coils and the negative side source; and,
(d) a logic circuit containing a position detection device for energizing said semiconductor switching elements so as to changeover the current toward each of said armature coils at intervals of about two-thirds of the width of said field magnet pole.

5. A motor as set forth in claim 1 wherein said coils and said field magnets have a space therein, three elements for absorbing magnetic energy accumulated in said armature coils, said three elements being disposed in the space inside said three armature coils and connected in parallel across the corresponding armature coils; a commutator consisting of six commutator pieces and secured to said rotating shaft; and two sets of brushes slidably contacting with said commutator, said sets of brushes being disposed in the space in said field magnet and separated at an angular interval of 90°.

6. In a coreless DC motor comprising a fixed field magnet (27, 121) having eight magnetic poles of N and S magnetized in equal angular widths; a magnetic material (2, 3, 12, 16, 70, 75-1) for closing magnetic paths of said field magnet; a rotating shaft (1, 15, 73) supported by bearings provided to a central portion of said magnetic material, an armature (5, 10, 40, 57) of one of disc- and cylindrical-shapes secured to said rotating shaft so as to be rotatable in said magnetic paths to face against said field magnet poles; three phase armature coils of lap winding arranged on said armature; and electric circuit means interconnecting said three-phase armature coils in a manner selected from the class consisting of delta-connection and Y-connection for supplying current to said coils, the improvement wherein: said three-phase armature coils comprise six windings (35-1 to 35-6, 95a-f) each arranged at equal angular interval so as to be non-superimposed with respect to one another on the armature by shifting the in-phase coils (95-1) of one-phase by 90°; each of said coils having an angular width equal to that of said field magnet pole.

7. A motor as set forth in claim 6 comprising:
(a) commutator means secured to said three-phase armature coil means and to said rotating shaft including positive and negative terminals;
(b) two brushes slidably contacting to said commutator means at an angular interval equal to the width of said field magnet pole, said two brushes being supplied with current from said positive and negative terminals;
(c) first to a ninth commutator pieces arranged on said commutator means at angular intervals of two-thirds of the width of said field magnet poles;
(d) conductor means for interconnections of a first group consisting of said first, fourth and seventh commutator pieces, of a second group consisting of said second, fifth and eighth commutator pieces, and of a third group consisting of said third, sixth and ninth commutator pieces; and, (e) terminal means for supplying said three-phase armature coil means with current through said three groups of commutator pieces.

8. A motor as set forth in claim 6 comprising:
(a) a current supply control circuit including slip rings, semiconductor switching elements and source terminals, having three lead wires led out from the three connection points of said three-phase armature coil means through three slip rings, each of said three lead wires being connected to two semiconductor switching elements in the forward/reverse directions, said semiconductor elements being connected in the forward direction to positive and negative source terminals respectively;
(b) a control rotor synchronously rotating with said armature;
(c) control band means provided on the periphery of said rotor, said control band means having a plurality of steps effecting different eddy current losses, the width of each of said steps being two-thirds of the width of said field magnet poles;
(d) a first oscillation circuit containing a first oscillation coil provided against said control band means;
(e) a second oscillation circuit containing a second oscillation coil provided at a predetermined distance from said first oscillation coil;
(f) an electric circuit for generating three detection outputs of a first position through the output of said first oscillation circuit in accordance with said steps of said control band means; an electric circuit for generating three detection outputs of a second position through the output of said second oscillation circuit in accordance with said steps of said control band means; and,
(g) a control circuit means for energizing through said three detection outputs of said first position said semiconductor switching elements connected to said positive source terminal respectively and for energizing through said three detection outputs of said second position said semiconductor switching elements connected to said negative source terminal respectively.

9. A motor as set forth in claim 6 with positive and negative source sides having two series of position detection means comprising two groups of position detection elements for a first position; two groups of position detection elements for a second position which elements being shifted in phase by an amount corresponding to the width of said field magnet poles with respect to respective position detection signals of said groups of position detection elements for said first position;
(b) three groups of semiconductor switching elements connected in series between said coils and the positive side source;
(c) three groups of semiconductor switching elements connected in series between said armature coils and the negative side source; and,
(d) a logic circuit containing a position detection device for energizing said semiconductor switching elements so as to changeover the current toward each of said armature coils at intervals of about two-thirds of the width of said field magnet pole.

10. A motor as set forth in claim 6 wherein said coils and said field magnets have a space therein, three elements for absorbing magnetic energy accumulated in said armature coils, said three elements being disposed in the space inside said three armature coils and connected in parallel across the corresponding armature coils; a commutator consisting of six commutator pieces and secured to said rotating shaft; and two sets of brushes slidably contacting with said commutator, said sets of brushes being disposed in the space in said field magnet and separated at an angular interval of 90°.

* * * * *